United States Patent
Tripathy et al.

(10) Patent No.: US 11,953,338 B2
(45) Date of Patent: Apr. 9, 2024

(54) REMOTE INITIALIZATION SYSTEM FOR A VEHICLE SYSTEM

(71) Applicant: Westinghouse Air Brake Technologies Corporation, Wilmerding, PA (US)

(72) Inventors: Janmejay Tripathy, Cedar Rapids, IA (US); Jeffrey D. Kernwein, Cedar Rapids, IA (US); Ann K. Grimm, Cedar Rapids, IA (US); Phillip A. Burgart, Cedar Rapids, IA (US)

(73) Assignee: WESTINGHOUSE AIR BRAKE TECHNOLOGIES CORPORATION, Wilmerding, PA (US)

( * ) Notice: Subject to any disclaimer, the term of this patent is extended or adjusted under 35 U.S.C. 154(b) by 63 days.

(21) Appl. No.: 17/458,841

(22) Filed: Aug. 27, 2021

(65) Prior Publication Data

US 2022/0082400 A1   Mar. 17, 2022

Related U.S. Application Data

(60) Provisional application No. 63/077,262, filed on Sep. 11, 2020.

(51) Int. Cl.
*G01C 21/36* (2006.01)
*G01C 21/34* (2006.01)
(Continued)

(52) U.S. Cl.
CPC ....... *G01C 21/362* (2013.01); *G01C 21/3461* (2013.01); *G01C 21/3664* (2013.01);
(Continued)

(58) Field of Classification Search
CPC .............. G01C 21/362; G01C 21/3461; G01C 21/3664; G01C 21/3691; G01C 21/20;
(Continued)

(56) References Cited

U.S. PATENT DOCUMENTS

| | | | |
|---|---|---|---|
| 2006/0025923 A1* | 2/2006 | Dotan | G08G 1/096861 340/995.12 |
| 2008/0288318 A1* | 11/2008 | Webb | G06Q 10/06315 705/7.22 |

(Continued)

OTHER PUBLICATIONS

Office Action dated Jan. 20, 2023 for corresponding Canadian Patent Application No. 3,129,308 (4 pages).
Second Examiner's Requisition dated Nov. 2, 2023 for corresponding Canadian Application No. 3,129,308 (7 pages).

*Primary Examiner* — Anne Marie Antonucci
*Assistant Examiner* — Patrick Daniel Mohl
(74) *Attorney, Agent, or Firm* — The Small Patent Law Group LLC; Christopher R. Carroll (57) ABSTRACT

A remote initialization system and method for a vehicle system receive trip data for an upcoming trip at an off-board device. Using the off-board device, the trip data is communicated to the different back-office systems, and one or more of mandatory directives or software configuration requirements are received at the off-board device from the different back-office systems. An initialization data set that includes at least some of the trip data and at least some of the one or more of the mandatory directives or the software configuration requirements is communicated from the off-board device to an onboard controller of the vehicle system. The initialization data set is configured to be used by the onboard controller to control movement of the vehicle system in the different sets of the routes.

20 Claims, 3 Drawing Sheets

(51) Int. Cl.
*G07C 5/00* (2006.01)
*H04L 67/12* (2022.01)

(52) U.S. Cl.
CPC ......... *G01C 21/3691* (2013.01); *G07C 5/008* (2013.01); *H04L 67/12* (2013.01)

(58) Field of Classification Search
CPC ......... G07C 5/008; H04L 67/12; H04L 67/34; B61L 27/10; B61L 15/0027; B61L 27/57; G08G 1/096716; G08G 1/096741; G08G 1/096775
See application file for complete search history.

(56) References Cited

U.S. PATENT DOCUMENTS

| | | | |
|---|---|---|---|
| 2011/0264363 A1* | 10/2011 | Cabral | G08G 1/096844 |
| | | | 701/532 |
| 2016/0152254 A1* | 6/2016 | Dreasher | B61L 25/02 |
| | | | 701/19 |
| 2019/0050220 A1* | 2/2019 | Daum | H04L 67/12 |
| 2019/0258467 A1* | 8/2019 | Frantz | G01C 21/3691 |
| 2021/0148721 A1* | 5/2021 | Chiu | G01C 21/3691 |
| 2021/0216081 A1 | 7/2021 | Tripathy | |
| 2021/0291864 A1* | 9/2021 | Gadh | G06Q 10/06375 |
| 2021/0323589 A1* | 10/2021 | Fanara | B61L 25/04 |
| 2022/0036725 A1* | 2/2022 | Chapman | G08G 1/097 |
| 2022/0063689 A1* | 3/2022 | Kumar | B61L 15/0072 |
| 2022/0119020 A1* | 4/2022 | Thiyagarajan | B61L 15/0072 |

* cited by examiner

REMOTE INITIALIZATION SYSTEM FOR A VEHICLE SYSTEM

CROSS-REFERENCE TO RELATED APPLICATIONS

This application claims priority to U.S. Patent Application No. 63/077,262, which was filed on 11 Sep. 2020, and the entire disclosure of which is incorporated herein by reference.

BACKGROUND

Technical Field

The subject matter described herein relates to systems that initialize vehicle systems for travel by ensuring that the data used by the vehicle systems for travel is complete and current.

Discussion of Art

Certain vehicle systems may require data concerning upcoming travel to allow the vehicles to safely complete travel. For example, some rail vehicle systems that travel using a positive train control (PTC) system may require initialization of an onboard segment of the PTC system. This initialization can involve ensuring that the onboard segment has the mandatory directives applicable to upcoming travel of the vehicle system, ensuring that the onboard segment has the correct software and software configuration for communicating with the off-board segments of the PTC system, and so on.

Initialization of the onboard segment and review of mandatory directives by a crew member onboard the vehicle system can be a lengthy process. The crew member may be required to log in with credentials, select the routes over which the vehicle system will travel for an upcoming trip, establish a unique identification or identifier for each section of routes (e.g., railroad) that the vehicle system will travel through, review the contents or makeup of the vehicle system, review mandatory directives (e.g., bulletins and authorities) for each area over which the vehicle system will travel, and the like.

Currently, this initialization is all accomplished using a relatively small display (e.g., 640×480 pixels) with eight software programmable keys onboard the vehicle system. Additionally, if the mandatory directives to be reviewed are not already stored by the onboard segment, the mandatory directives may need to be communicated in wireless messages over a wireless network, if available, or via cellular or 220 MHz radio. This can take a significant amount of time as the number of mandatory directives reaches an upper limit (e.g., the maximum allowed directives). Lengthy initialization processes can contribute to delays in vehicle system departures and a decrease in the average velocity for several vehicle systems.

BRIEF DESCRIPTION

In one embodiment, a method includes receiving trip data for an upcoming trip of a vehicle system at an off-board device. The trip data includes information related to travel of the vehicle system within different sets of routes where the travel of the vehicle system within the different sets of the routes is restricted or controlled by different back-office systems. The method includes communicating (using the off-board device) the trip data to the different back-office systems, receiving one or more of mandatory directives or software configuration requirements at the off-board device from the different back-office systems responsive to communicating the trip data to the different back-office systems, and communicating an initialization data set that includes at least some of the trip data and at least some of the one or more of the mandatory directives or the software configuration requirements from the off-board device to an onboard controller of the vehicle system. The initialization data set may be used by the onboard controller to control movement of the vehicle system in the different sets of the routes.

In one embodiment, a system includes an off-board computer device that may receive trip data for an upcoming trip of a vehicle system while the off-board computer device is off-board the vehicle system. The trip data may include information related to travel of the vehicle system within different sets of routes where the travel of the vehicle system within the different sets of the routes may be restricted or controlled by a corresponding different back-office system. The off-board computer device may communicate the trip data to the different back-office systems and to receive one or more of mandatory directives or software configuration requirements from the different back-office systems responsive to communicating the trip data to the different back-office systems. The off-board computer device is configured to communicate an initialization data set that includes at least some of the trip data and at least some of the one or more of the mandatory directives or the software configuration requirements to an onboard controller of the vehicle system. The initialization data set is configured to be used by the onboard controller to control movement of the vehicle system in the different sets of the routes.

In one embodiment, a method includes receiving trip data for an upcoming trip of a vehicle system at an off-board device. The trip data includes information related to travel of the vehicle system within different sets of routes where the travel of the vehicle system within each of the different sets of the routes is restricted or controlled by a different back-office system. The method includes communicating, using the off-board the device, the trip data to the different back-office systems and receiving mandatory directives and software configuration requirements at the off-board device from the different back-office systems responsive to communicating the trip data to the different back-office systems. At least two of the different back-office systems have different software configuration requirements of the software configuration requirements. The method includes communicating an initialization data set that includes at least some of the trip data, the mandatory directives, and the software configuration requirements from the off-board device to an onboard controller of the vehicle system. The initialization data set is configured to be used by the onboard controller to control movement of the vehicle system in the different sets of the routes.

BRIEF DESCRIPTION OF THE DRAWINGS

The inventive subject matter may be understood from reading the following description of non-limiting embodiments, with reference to the attached drawings, wherein below.

DETAILED DESCRIPTION

Embodiments of the subject matter described herein relate to initialization systems and methods. These systems and methods may provide a way for a controller, an operator or crew of operators of a vehicle system (collectively, an "operator") to accomplish initialization and review of the data needed to complete upcoming travel of a vehicle system in an efficient way. The subject matter described herein discloses one or more ways in which a computerized system may operate to reduce the time and effort needed to prepare the data needed for travel. The systems and methods can be used by human operators to review mandatory directives with a more efficient human-machine interface and prior to sitting on a vehicle system that is otherwise ready to depart. The systems and methods may provide an efficient transfer of mandatory directive data to the onboard components of the vehicle systems.

Some mandatory directives can be required restrictions or rules on the travel of one or more vehicle systems. For example, a mandatory directive can be a reduced speed limit (e.g., lower than a previously existing or longstanding speed limit) for travel within a designated route segment, a prohibition on traveling on or entering a designated route segment, a required spacing between vehicle systems during travel on a designated route segment, a prohibition on certain cargo being carried by a vehicle system on a designated route segment, vehicle weight restrictions, and the like. In one embodiment relating to rail transport, suitable mandatory directives can be mandatory directives of a PTC system. In an embodiment relating to automotive travel, the mandatory directive may relate to a work zone, accident incident, or the like, while others may relate to traffic volume, geographical locations (such as school zones, residential areas, etc.), and weather conditions. For human-operated vehicles (in vehicle or remotely) the directive may be advisory or it may affect the vehicle controller directly.

Suitable vehicle control systems can be a positive vehicle control system, a negative vehicle control system, or both a positive and negative vehicle control system. A positive control system (e.g., the PTC system) prevents a vehicle system from entering into a route segment, traveling above a designated speed limit, or the like, unless a signal is received by the vehicle system indicating that the vehicle system can enter into the route segment, travel faster than the speed limit, etc. A negative control system allows a vehicle system to enter into the route segment, traveling above the designated speed limit, or the like, unless a signal is received by the vehicle system indicating that the vehicle system cannot enter into the route segment, cannot travel faster than the speed limit, etc. Some systems may selectively use aspects of positive and negative control systems. Other suitable vehicle systems may use analogous terminology, such as a 'no fly corridor'. Some vehicle control systems may use static limits and restrictions, dynamic limits and restrictions, or a combination of both static and dynamic limits and restrictions. In one example, a vehicle control system may have a static limit based on an upper vehicle weight, and a dynamic limit based on vehicle speed. In another example, a geographic area may have a first limitation during one part of the day and another, different, second limitation during a second part of the day.

In one embodiment, the initialization systems and methods can include or provide a web-based application that can run on suitable hardware selected based at least in part on end use parameters and requirements. Suitable examples of hardware may include one or more of a personal or desktop computer, a laptop computer, tablet computer, mobile phone, and the like. For credentialing in one embodiment, during use, an operator (e.g., a crew member) can log into the application with the same credentials as used for initialization of the onboard segment of a vehicle control system, which in this example is an onboard segment of the interoperable electronic train management system, or I-ETMS that is commercially available from Wabtec Corporation. The crew member can perform initialization of the data for an upcoming trip using the web-based application. This may be accomplished by selecting groups of routes that the vehicle system may travel on (e.g., selecting operating railroads), establishing identifiers for the vehicle system for each of these groups (e.g., train IDs for each railroad), and reviewing vehicle system information (e.g., train consist information), such as the number and/or arrangement of propulsion-generating vehicles and/or non-propulsion-generating vehicles in the vehicle system, the cargo being carried by the vehicle system, etc. Additionally, the operator can enter an identifier of the vehicle in the vehicle system that will be controlling movements of other vehicles in the vehicle system (e.g., the locomotive ID of the controlling locomotive).

The application or device running the application can be assigned a network address, such as an edge message protocol (EMP) address, and is able to communicate with one or more off-board systems associated with the different groups of routes. These off-board systems can be the back-office segments (BOS) or servers of a PTC system. Each off-board system can be responsible for communicating signals to the vehicle systems traveling within the group of routes associated with that off-board system. The application can communicate with the BOS of each operating group of routes via an existing network, such as the existing PTC federated network with the messages already defined in the industry standard Office—Locomotive Segment Interface Control Document (ICD).

The initialization system can have access to a Key Exchange Server (KES) to retrieve the data keys necessary to communicate securely with the off-board systems. The initialization system can retrieve information from the off-board systems, such as lists of identifiers of the vehicle systems in the group of routes associated with the different off-board systems (e.g., train ID lists), preferred and acceptable software and configuration file versions of each off-board system (for the application to communicate with the off-board systems), train subdivision or district lists, mandatory directive datasets, and the like. The configuration file may include, among other items, one or more protocols, interface information, handshake information, cybersecurity keys, decryption keys, checksum information, language information and dictionary files, and the like. Other optionally included data may include equipment type and model, age, health and maintenance information, and the like. In one embodiment, the data file may include wireless frequency and/or channel information.

The initialization system can detect disconnects in the preferred and acceptable software and configuration file versions provided by each of the off-board systems. For example, the initialization system can determine whether the software used by a vehicle system to communicate with an off-board system is compatible and able to communicate with the off-board system. The initialization system can provide a notification to the operator of the vehicle system and/or a system administrator of the off-board system who may be able to resolve the software conflict before the conflict would affect the schedule of the vehicle system. For example, the software can be updated to a newer version, reverted to an older version, or another software application can be downloaded to the vehicle system before the vehicle system departs or while the vehicle system has network access to obtain the software change.

The initialization system can present mandatory directives to the operator of the vehicle system for review and acknowledgement or acceptance, before the operator boards the vehicle system. The initialization system can convey the crew action (e.g., acknowledgement or acceptance of the directive) back to the off-board system that issued the mandatory directive.

The initialization system can create a data file that contains information provided by the operator or crew of the vehicle system and retrieved from the off-board systems. This data file can include the identifier of the controlling vehicle in the vehicle system, credentials of the operator (e.g., a login/password combination), preferred and/or acceptable software and configuration file versions, a list of the groups of routes that the vehicle system will travel through, clearance numbers, identifiers of other vehicle systems within the groups of routes that the vehicle system will travel through, subdivision or district lists, mandatory directive datasets, route data files (e.g., track data files), and the like. A unique identifier can be created for this data file by the initialization system and provided to the crew member to enable later retrieval of the data file (e.g., from onboard the vehicle system). The unique identifier is termed as such for sake of easy reference, but there is no requirement that the identifier actually be unique—rather, the term 'unique identifier' refers to a labeling system that allows for one or more controlling and management systems to avoid conflicting or confusing label systems for an asset or assets. As used herein, the unique identifier is a digital tag that refers to (during a determined period) an asset or set of assets. This asset, or assets, may need to be referred to across multiple systems without uncertainty as to which asset, or assets, is being identified. The data file can be transferred to a server, such as a mobile device manager (MDM) server. If the vehicle identifier (e.g., of the controlling vehicle) is included in the data file, the server can push or otherwise send the data file to the onboard segment of the vehicle system for storage in a memory (e.g., an MDM repository). If the identifier is not included in the data file, the data file can remain on the server until the file is pulled or otherwise requested by the onboard segment of the vehicle system as part of the onboard initialization process. The transfer (push or pull) of a single data file can be much faster and more efficient than querying for each individual piece of data from the off-board systems over wireless networks.

Once an operator is on board the vehicle system, the operator can begin initialization of the onboard segment of the control system. The initialization system can present the operator with a choice to either continue with initialization as is currently performed or enter the identifier of the data file. If the operator enters the data file identifier, the onboard segment can obtain (e.g., download) the data file from the server if the data file has not already been downloaded. Then, the onboard segment can proceed through initialization using the information in the data file instead of the operator being prompted for manual data entry or sending queries for the information to the off-board systems.

The operator can be prompted by the initialization system to review the vehicle system information again once the operator is on board the vehicle system, as there may be changes to train consist that may or may not be reflected in the information available from the off-board systems or other off-board sources of information. The crew may be unaware of such changes until the crew is on board or at the vehicle system.

When initialization is complete, the onboard segment can poll the off-board systems to determine which mandatory directives should be onboard the vehicle system. This can be performed to detect any deviations from the set of mandatory directives in the data file from the initialization system. The crew on the vehicle system can be prompted by the initialization system to review, acknowledge, or accept changes in the mandatory directives. These directives can be used to automatically change or otherwise control movement of the vehicle system. For example, a mandatory directive in the data file that is created or modified can be used by the onboard controller of the vehicle system to slow the speed of the vehicle system, increase the speed of the vehicle system, change a direction of the vehicle system (e.g., by moving from one route, track, or road to another route, track, or road based on the information contained within the mandatory directive.

Figure 1:
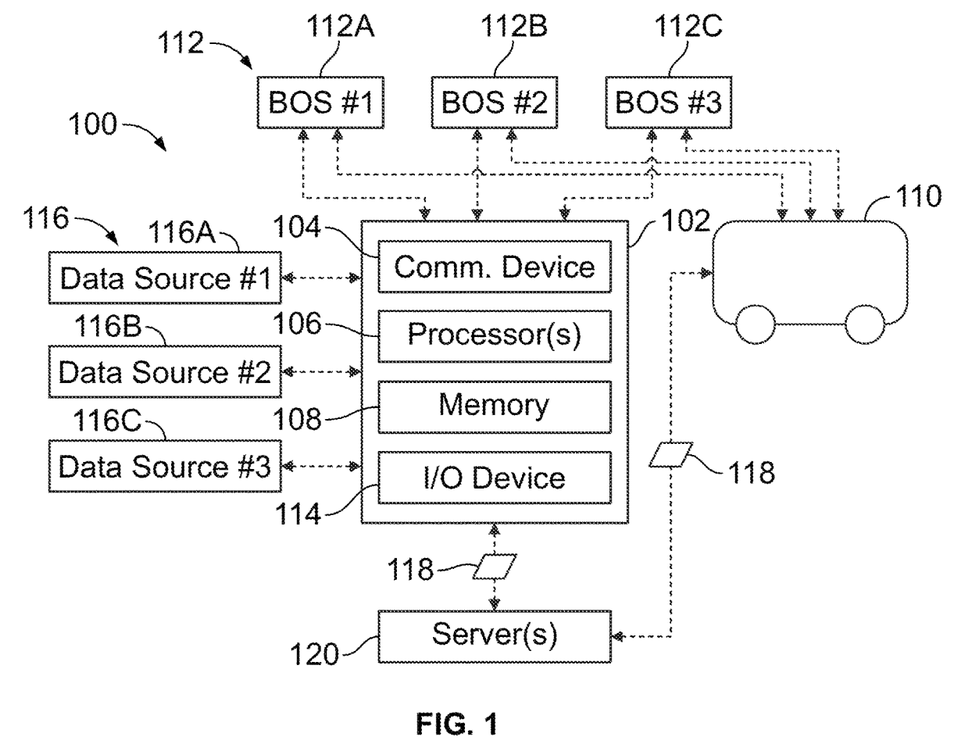
FIG. 1 illustrates one example of an initialization system.

FIG. 1 illustrates one example of an initialization system 100 according to an embodiment of the invention. The initialization system includes an off-board computer device 102, such as a personal desktop computer, a laptop computer, a mobile phone, a tablet computer, or the like. The off-board computer device includes a communication device 104 that allows the off-board computer device to communicate with other devices and systems as described herein via wired and/or wireless connections. This communication device can represent transceiving hardware, such as one or more modems, antennas, transceivers, or the like. The off-board computer device includes one or more processors 106 that represent microprocessors, integrated circuits, field programmable gate arrays, or the like, that perform the operations described herein in connection with the processors. A memory 108 of the off-board computer device represents a tangible and non-transitory computer readable medium, such as a computer hard drive, a removable computer memory, or the like. The memory can store instructions that direct operation of the processors according to the operations described and/or shown in flowcharts herein.

The off-board computer device can receive trip data for an upcoming trip of a vehicle system 110. The trip data can be received from one or more different sources 116 (e.g., Data Source #1 116A, Data Source #2 116B, and Data Source #3 116C), such as input provided by an operator, from a dispatch system that orders different vehicle systems to depart from various locations, from a scheduling system that sets schedules for the vehicle systems to travel, etc. The off-board computer device can include an input and/or output device 114 (I/O Device in FIG. 1) that represents a touchscreen, keyboard, electronic display other than a touchscreen, speaker, light, or the like). The input and/or output device can be used to provide trip data to the off-board computer device as well.

The trip data can include an identification of which routes (or sets of routes) that the vehicle system is planned to travel within during the upcoming trip or travels. For example, the trip data can identify the planned routes on which the vehicle system will travel from one location to another location. The trip data can include one or more identifiers of the vehicle system. Different identifiers can be used for the same vehicle system. For example, a different, unique identifier can be used to identify the vehicle system for each of several different back-office systems. The different back-office systems may each use a different identifier of the vehicle system to identify the vehicle system during travel of the vehicle system within the regions associated with the respective back-office systems (described below).

The trip data can include one or more identifiers of a vehicle in the vehicle system. One vehicle may control the operation of other vehicles within the vehicle system based on or using the mandatory directives in the data file that is created or modified. For example, a controlling vehicle can issue commands to other vehicles within the vehicle system to control braking of those other vehicles, to control throttle settings of the other vehicles (where the other vehicles are capable of generating propulsion), and the like. The controlling vehicle may be the vehicle that is to communicate with other vehicle systems, the back-office systems, and the like. A single unique identifier of the controlling vehicle may be included in the trip data, or multiple unique identifiers of the controlling vehicle may be included in the trip data. For example, different identifiers of the controlling vehicle may be provided for the different back-office systems.

The vehicle system may be a single or multi-vehicle system that travels along routes between various locations. In one embodiment, the vehicle system is a rail vehicle system (e.g., a train, transit rail vehicle system, or the like), but not all embodiments described herein are limited to rail vehicles. For example, the vehicle system can represent one or more automobiles, buses, mining vehicles, marine vessels, agricultural vehicles, other off-highway vehicles, and aircraft. With respect to multi-vehicle systems, the vehicles in the vehicle system may be mechanically connected by couplers in one embodiment, but in other embodiments may be mechanically disconnected from each other but communicate with each other such that the separate vehicles travel together as a vehicle system (e.g., as a convoy, consist, platoon, swarm, fleet, or virtually coupled grouping).

The trip data includes information related to travel of the vehicle system within different sets of routes, where the travel of the vehicle system within each of the different sets of the routes is restricted or controlled by a different back-office system 112 (e.g., BOS #1 112A, BOS #2 112B, and BOS #3 112C in FIG. 1). The back-office systems may be referred to as off-board systems. In one embodiment, the back-office systems are back-office systems of a PTC system.

Figure 2:
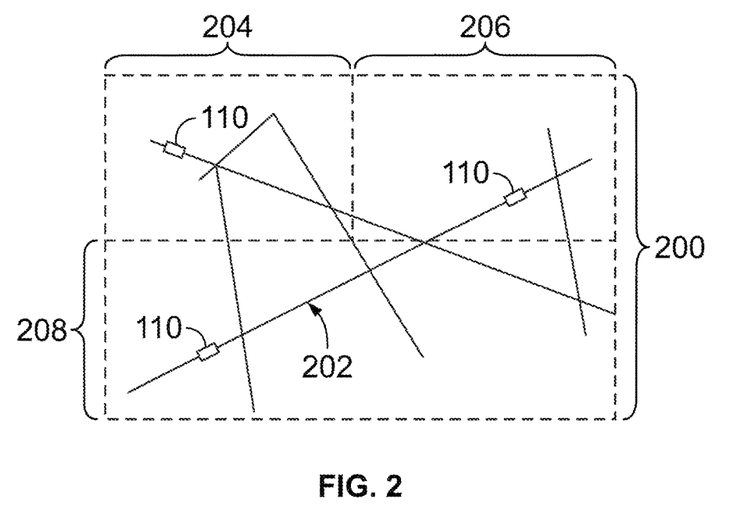
FIG. 2 illustrates a network of routes.

With continued reference to the initialization system shown in FIG. 1, FIG. 2 illustrates a network 200 of routes 202. The routes are interconnected with each other such that vehicle systems can travel along different combinations of the routes between different locations. Different groups of the routes (and/or different segments of the routes) may be associated with different back-office systems. For example, the routes located within a first area or region 204 may be associated with a first back-office system, the routes located within a second area or region 206 may be associated with a different, second back-office system, the routes located within a third area or region 208 may be associated with a third back-office system, and so on.

Each of the back-office systems can monitor the routes within the area or region associated with (e.g., assigned to) the back-office system to determine where vehicle systems are located on the routes, where maintenance crews are working on the routes, where routes are damaged, or where there are other reasons or prohibitions for preventing vehicles from entering into certain route segments or traveling faster than a designated speed limit on the route segments. The back-office systems can issue the mandatory directives to the onboard segments of the vehicle control systems to notify the vehicle systems traveling within the areas or regions of the back-office systems of the vehicle system locations, maintenance locations, damage locations, etc. The onboard segments on the vehicle systems can examine the directives prior to entering the area or section associated with a back-office system to ensure that the onboard segments can operate to automatically prevent the vehicle systems from entering into a route segment that the vehicle systems are not permitted, from moving faster than a designate speed limit, or the like.

Returning to the description of the initialization system shown in FIG. 1, the off-board computer device can communicate the trip data to the different back-office systems. The off-board computer device can communicate the trip data to the back-office systems associated with the routes in which the vehicle system is scheduled or planning to travel.

In response to sending the trip data from the off-board computer device to the back-office systems, one or more of these back-office systems that received the trip data may respond with the mandatory directives of the regions associated with the back-office systems.

The off-board computer device can present the mandatory directives to an operator. For example, the off-board computer device can present a website or another interface that provides the mandatory directives to the operator using the off-board computer device. The operator can scroll through or otherwise review the mandatory directives. The off-board computer device can receive operator input via the input and/or output device indicating whether the operator has reviewed and acknowledges or accepts the mandatory directive for each of the mandatory directives. This can ensure that the operator is aware of the mandatory directives before boarding the vehicle system. This can speed up departures and/or avoid delaying departures by waiting until the operator is on board the vehicle system to review the mandatory directives. Responsive to the operator acknowledging and/or accepting the mandatory directives via the off-board computer device, the off-board computer device can wirelessly communicate an acceptance signal to the back-office systems that issued the mandatory directives. This can notify the back-office systems that the operator is aware of the mandatory directives.

Additionally or alternatively, one or more of the back-office systems may communicate software requirements back to the off-board computer device. The software requirements may identify one or more software applications, software configurations or configuration file versions, and/or software versions that are required for communication between the vehicle system and the back-office systems. Different back-office systems may use different software applications, configurations of software (e.g., port numbers, network addresses, permissions, etc.), and/or software versions for wirelessly communicating with the vehicle systems. The back-office systems can communicate these requirements to the off-board computer device.

The off-board computer device can compare the software requirements of the back-office systems with corresponding software information of the vehicle system. The off-board computer device can store the current software applications, current software versions, and/or current software configurations used by the vehicle system (e.g., in the memory). The off-board computer device can compare the current software information of the vehicle system with the software requirements of the back-office systems to determine whether there are any conflicts. A conflict can occur when the vehicle system does not have a software application required for communicating with a back-office system associated with a region through which the vehicle system is planned to travel. A conflict can occur when the vehicle system has a different (e.g., older or newer) version of a software application that the version required for communicating with the back-office system. A conflict can occur when the settings of the software onboard the vehicle system do not match the software settings required by the off-board system(s).

If a conflict is identified, the off-board computer device can generate an operator notification of the conflict. For example, an alphanumeric message may be displayed, a sound may be played, a light may be activated, etc., on the input and/or output device. The operator can then take needed steps to change the configuration of the software used by the onboard controller of the vehicle system to communicate with one or more of the back-office systems. For example, the operator can direct the onboard controller to download a new software application, update the version of a software application to a newer version, revert the version of the software application to a prior version, change one or more settings of the software application, etc. Optionally, the off-board computer device can change the configuration of the software. For example, the off-board computer device can download a software application, download an update to the software application, direct a reversion to a prior software version, direct a change in software settings, or the like.

The software application, version, update, reversion, or change can be included in an initialization data set (described below) that is communicated to the onboard controller of the vehicle system. Alternatively, the off-board device can include instructions for downloading the software application, other software version, change in settings, or the like, in the initialization data set. The onboard controller can then obtain the different software application, obtain the other application version, and/or change the software settings based on receipt of this initialization data set. Ensuring that the onboard controller has the correct software configuration prior to the operator boarding the vehicle system can speed up departures and/or avoid late departures. Any conflicts involving the software configuration requirements can be rectified earlier in the process to avoid delays involving downloading or modifying the software at or just prior to departure.

The off-board computer device can create the initialization data set that includes some or all of this information. For example, the off-board computer device can compile (e.g., collect and/or compose data from different sources and combine into a data file) the trip data, mandatory directives, software configuration requirements, etc., into a single data file 118 or multiple files 118. This initialization data set is created to be used by an onboard controller of the vehicle system to control movement of the vehicle system in the different sets of the routes.

The initialization data set may be a single data file. This can ensure that the data and information needed to initialize the onboard controller for a trip is sent and received in a single file, and that no information outside of the file is missed or not received by the onboard controller.

The off-board computer device can include a unique file identifier in the data file. This identifier can be used to later retrieve the data file from onboard the vehicle system. For example, an operator onboard the vehicle system may be required to input the identifier into the onboard controller before the onboard controller uses contents of the data file to prepare for departure.

In one embodiment, the initialization data file is not directly sent to the onboard controller of the vehicle system from the off-board computer device. Instead, the off-board computer device can upload the data file to one or more servers 120 via one or more networks. The initialization data file(s) can then be pushed (e.g., automatically sent) or pulled (e.g., sent responsive to receiving a request) from the server to the onboard controller.

Figure 3:
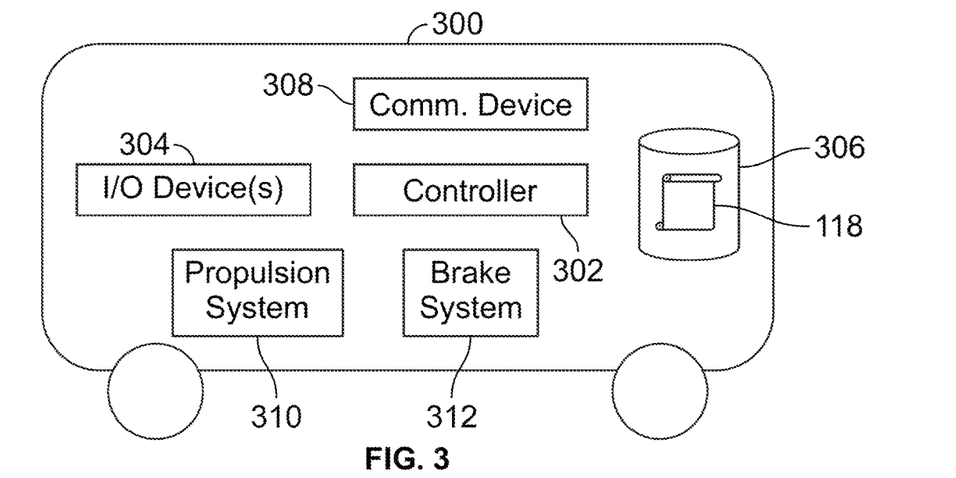
FIG. 3 illustrates one example of a vehicle that may be included in a vehicle system shown in FIG. 1.

Once onboard the vehicle system, the operator or another operator can examine the information contained in the initialization data file(s). FIG. 3 illustrates one example of a vehicle 300 that may be included in the vehicle system 110 shown in FIG. 1. The vehicle shown in FIG. 3 may be the controlling vehicle of the vehicle system. Alternatively, the vehicle shown in FIG. 3 may be another vehicle in the vehicle system. The vehicle includes the onboard controller 302 described above, which can represent one or more processors that perform operations described in connection with the onboard controller. The vehicle includes one or more input and/or output devices 304 (I/O Device(s) 304 in FIG. 3), which can represent touchscreens, other electronic displays, keyboards, switches, lights, etc. The onboard controller can present contents of the initialization data file to the operator via the input and/or output device onboard the vehicle. The initialization data file can be stored in a memory 306, such as a tangible and non-transitory computer readable medium, as described above.

The operator can review the information contained in the initialization data file and provide input via the input and/or output device of the vehicle. For example, the operator can approve or acknowledge information in the file, modify information in the file, or the like. The operator can provide information to modify the contents of the initialization data file prior to departure, and the onboard controller can then modify the data accordingly. For example, the consist information regarding the vehicle system in the initialization data file may have changed since the file was created and is no longer accurate. One or more vehicles may have been added to or removed from the vehicle system, the cargo type and/or amount may have changed, the time of departure may have been modified, the route(s) to be traveled may have changed, and so on.

The vehicle can include a communication device 308 that can communicate with off-board devices. For example, the communication device can include antennas, modems, transceiving circuitry, etc. The onboard controller can use the communication device 308 to send polling signals to one or more of the back-office systems. These polling signals can request an identification of mandatory directives that should be included in the initialization data set 118. The onboard controller can send these polling signals to ensure that the mandatory directives in the initialization data set are current and accurate.

The onboard controller can receive the current mandatory directives from the back-office systems and compare these received mandatory directives with the mandatory directives in the initialization data set. The onboard controller can make this comparison to determine whether there are any discrepancies (e.g., differences) between the mandatory directives recently received from the back-office systems and the mandatory directives in the initialization data set. The onboard controller can present the discrepancies, if any, to the operator via the input and/or output device(s) onboard the vehicle. The operator can then provide an acceptance of the discrepancies via the input and/or output device(s) to notify the onboard controller that the operator is aware of the discrepancies. The onboard controller can then use the new mandatory directives, if any, to control movement of the vehicle system.

For example, during movement of the vehicle system, the onboard controller can operate as the onboard segment of the vehicle control system (e.g., the PTC system). If the onboard controller determines that the vehicle is moving in violation of a mandatory directive or is moving toward a violation of a mandatory directive, the onboard controller can automatically send command signals to a propulsion system 310 and/or a brake system 312 of the vehicle to change speeds, throttle settings, brake settings, or the like, and prevent the vehicle system from violating the mandatory directive. Optionally, the command signals can be sent to one or more other vehicles in the vehicle system (where the vehicle system includes several vehicles). The propulsion system represents one or more engines, motors, and the like, that operate to generate propulsion for moving the vehicle along one or more routes. The brake system represents one or more brake that can be engaged to slow or stop movement of the vehicle system.

For example, if a mandatory directive indicates that the vehicle system is not to enter into a route segment that the vehicle system is headed toward, the onboard controller can engage brakes of the vehicle system and/or reduce a throttle setting. Optionally, the onboard controller can automatically steer the vehicle system onto another route to avoid the prohibited route segment. If a mandatory directive indicates that the vehicle system is not to travel at speeds above a speed limit, the onboard controller can engage brakes of the vehicle system and/or reduce a throttle setting.

As the vehicle system moves along the routes and between regions of different back-office systems, the onboard controller can communicate with the different back-office systems because the software requirements of the various back-office systems have been checked and the software operating onboard the vehicle system meets these requirements before the vehicle system enters any region of these back-office systems. This can ensure that the vehicle system is not prevented from entering an upcoming region where the software operating onboard the vehicle system does not match the requirements of the upcoming region. The onboard controller can provide the back-office system of the upcoming region with the identifier(s) of the vehicle system to identify the vehicle system (and/or the controlling vehicle) to the back-office system. Having this information onboard the vehicle system and verified before departure can greatly speed up transitions of the vehicle system between regions.

Figure 4A:
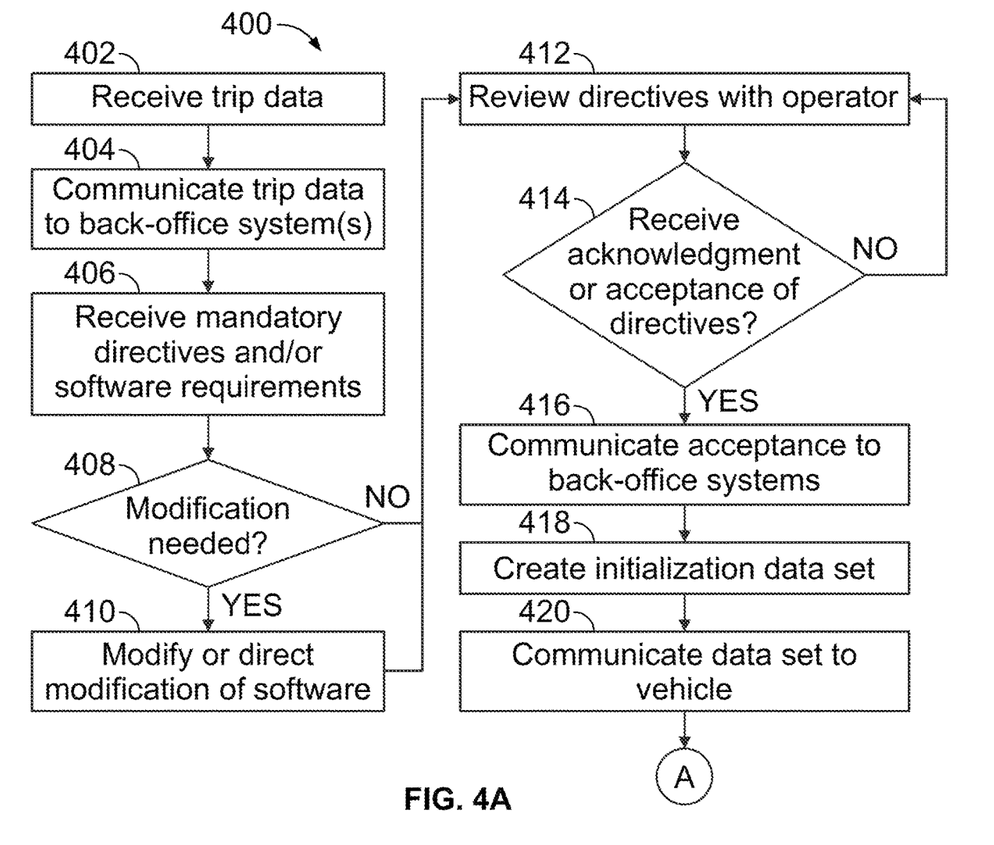
FIGS. 4A and 4B illustrate a flowchart of one example of a method for initializing data for a trip of a vehicle system and controlling movement of the vehicle system using the initialization data.
Figure 4B:
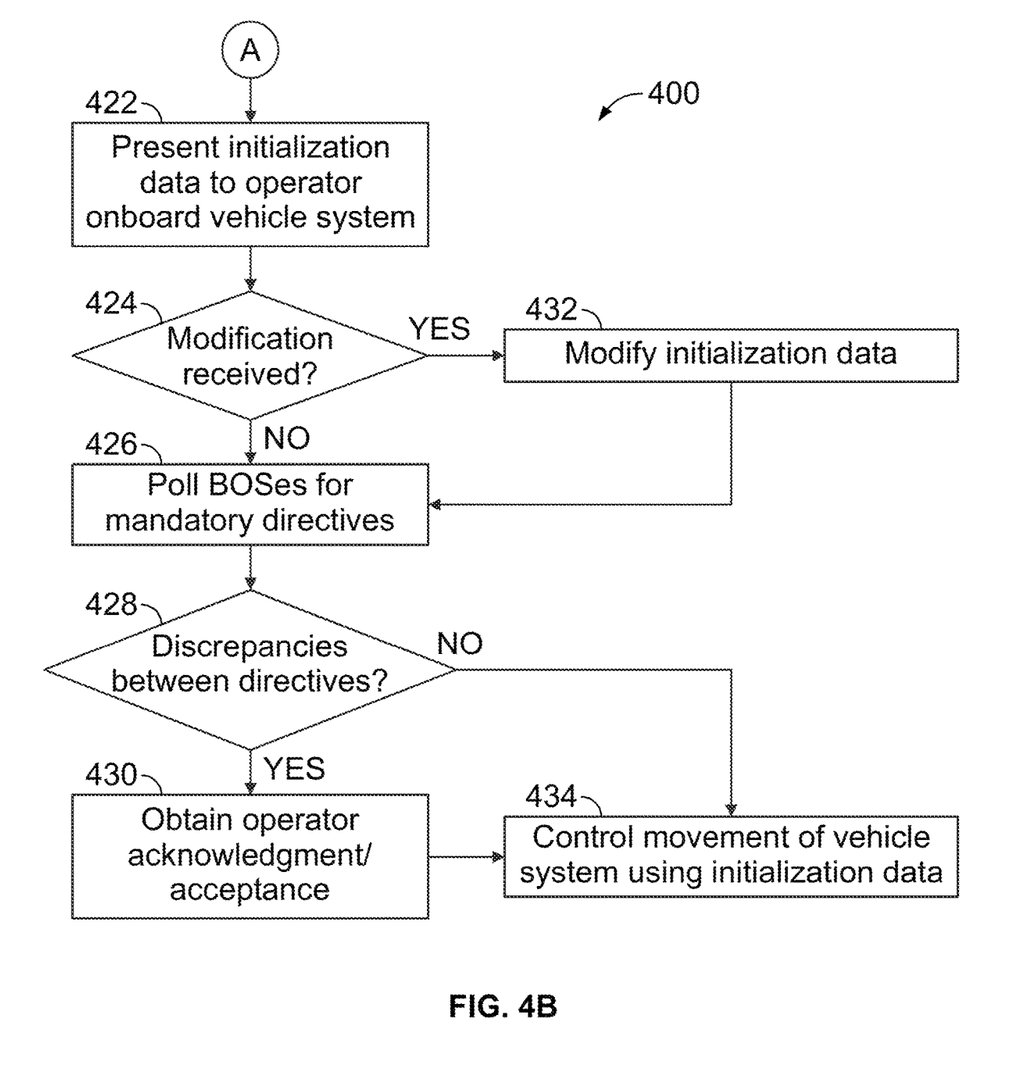

FIGS. 4A and 4B illustrate a flowchart of one example of a method 400 for initializing data for a trip of a vehicle system and controlling movement of the vehicle system using the initialization data. The method can represent operations performed by the off-board computer device and the onboard controller. Optionally, only part of the method can be performed (e.g., only by the off-board computer or only by the onboard controller).

At step 402, trip data is received. The trip data can be received at the off-board computer from different sources. For example, an operator, dispatch, or the like, may input information on the characteristics of the vehicles in the vehicle system, cargo carried by the vehicle system, the schedule of the vehicle system, the number of vehicles in the vehicle system, the arrangement of vehicles in the vehicle system, and the like. The trip data can be received and presented on the off-board computer via a website or web-based application for easier review by the operator (relative to reviewing the data on a smaller screen or interface other than a website). At step 404, the trip data is communicated from the off-board computer device to one or more back-office systems. The trip data can be communicated to the back-office systems associated with the areas where the vehicle system will be traveling through to notify the back-office systems that the vehicle system will be traveling through the routes in those areas.

At step 406, one or more mandatory directives are received by the off-board computer device. The mandatory directives can be sent from the back-office systems associated with the routes along, through, or over which the vehicle system is planning to travel. The back-office systems may send the mandatory directives responsive to receiving the trip data from the off-board computer. For example, the back-office systems may receive the trip data having the identifier(s) of the vehicle system and the routes that the vehicle system will be traveling along, and can respond to this information by sending the current mandatory directives for the routes. Optionally, the back-office systems can send software configuration requirements to the off-board computer. The back-office systems can send these requirements so that the vehicle system is aware (via the initialization data built by the off-board computer) of the software applications, versions, and/or settings needed to communicate with the back-office systems.

At step 408, a determination is made as to whether a modification is needed to the software configuration of the vehicle system. For example, the off-board computer device may store information (e.g., the memory of the off-board computer device) about the current software applications, versions, and/or settings used by the onboard controller and/or the onboard communication device of the vehicle system to communicate with back-office systems during movement of the vehicle system. The off-board computer can compare this information with the software configuration requirements received from the back-office systems to determine whether any changes are needed. If the off-board computer determines that the software applications, versions, and/or settings of the onboard controller and/or onboard communication device do not match the software configuration requirements of any of the back-office systems, then the off-board computer determines that a change to the software applications, versions, and/or settings of the onboard controller and/or onboard communication device may need to occur. As a result, flow of the method can proceed toward step 410. Otherwise, the software applications, versions, and/or settings of the onboard controller and/or onboard communication device may not need to be modified to allow for communication with the different software applications, versions, and/or settings of the different back-office systems. For example, the different software applications required by the different back-office systems may all be already on the memory of the vehicle system for use by the onboard controller and/or onboard communication device (e.g., 308) such that no new applications, updates, reversions, or changes to the software are needed.

At step 410, the software of the onboard controller and/or onboard communication device is modified or directed to be modified. The off-board computer device can include instructions in the initialization data set that direct the onboard controller and/or onboard communication device to download another software application, upgrade a version of a software application, revert the version of a software application to a prior version, change the settings of a software application, or the like. Optionally, the off-board computer device can download the software application, the upgrade to the software application, or the prior version of the software application, and include this downloaded data in the initialization data set. Alternatively, the off-board computer device can send a signal to the onboard controller and/or the onboard communication device (e.g., indirectly via the server or directly) directing the onboard controller and/or onboard communication device to download another software application, upgrade a version of a software application, revert the version of a software application to a prior version, change the settings of a software application, or the like.

At step 412, the mandatory directives of the back-office systems are presented for review by the operator. The off-board computer device can generate a website or other interface having a list, table, or the like, showing multiple mandatory directives at the same time. The operator of the off-board computer device can then select the mandatory directives for individual review or can review multiple mandatory directives at the same time.

The operator can then provide input to the off-board computer device for each of the mandatory directives or for multiple (or all of the) mandatory directives that indicates whether the operator has reviewed and understood the mandatory directives. Receipt of this input can indicate the acknowledgement or acceptance of each of the mandatory directives by the operator. At step 414, a determination is made as to whether the operator has provided this acknowledgement or acceptance of all the mandatory directives presented by the off-board computer device. The off-board computer device can determine whether the operator provided input indicating acceptance or acknowledgement of each of the mandatory directives. If this input is not received for any of the mandatory directives, then the absence of this input can indicate that the operator has not reviewed or understood the mandatory directive. As a result, flow of the method can return toward step 412 so that the off-board computer device can present (to the operator) any mandatory directives that have not been accepted or acknowledged by the operator. If the input indicating acceptance or acknowledgement has been received, then flow of the method can proceed toward step 416.

At step 416, the acceptance or acknowledgment of the mandatory directives are communicated to the back-office systems. The off-board computer device can send one or more signals to the back-office systems indicating that the operator has accepted or acknowledged the mandatory directive(s) issued by the respective back-office system(s).

At step 418, an initialization data set is created. The off-board computer device can combine the trip data, mandatory directives, software configuration settings, and the like, into a single data file as the initialization data set. Alternatively, multiple files may be created having different portions of this information. At step 420, the initialization data set is communicated to the vehicle system. For example, the file can be communicated to a server off-board the vehicle system and separate from the off-board computer device. The vehicle system may then pull the file off the server or the file may be pushed to the vehicle system from the server. Alternatively, the off-board computer device can send the file directly to the vehicle system.

At step 422 (shown in FIG. 4B), the initialization data is presented to the operator onboard the vehicle system. This may be the same or different operator than the operator described above in connection with operational steps 402 through 420. The onboard controller can direct a display device onboard the vehicle system to present at least some of the initialization data to the operator.

At step 424, a determination may be made as to whether any of the initialization data is modified (or has been corrupted). For example, the operator may determine that the information about the vehicle system has changed due to one or more vehicles being added to or removed from the vehicle system, the cargo being carried by the vehicle system changing, the schedule of the vehicle system changing, or the like, since the initialization data set was created. If the operator has provided input to change the initialization data, then flow of the method can proceed toward step 432 where the initialization data is changed accordingly. Otherwise, flow of the method can proceed toward step 426.

At step 426, the back-office systems are polled for mandatory directives. The onboard controller can communicate signals to the back-office systems to determine whether any new mandatory directives have issued or any prior mandatory directives have been modified or canceled since the mandatory directives previously were sent from the back-office systems. In response, one or more of the back-office systems may send new or updated mandatory directives, or an indication that a mandatory directive has been canceled or has expired.

At step 428, a determination is made as to whether any of the new, updated, or canceled mandatory directives received in response to the polling at step 426 conflict with any of the mandatory directives received at step 406. For example, the onboard controller can determine whether two or more mandatory directives received at step 406 and in response to step 426 are for the same segment of a route but are inconsistent with each other. If there are inconsistent or conflicting mandatory directives, then flow of the method can proceed toward step 430. Otherwise, flow of the method can proceed toward step 434.

At step 430, acceptance or acknowledgement of discrepancies between the mandatory directives identified at step 428 is obtained. The onboard controller can present the operator with the differences between the mandatory directives and the operator can provide input indicating that the operator is aware of the differences.

At step 434, movement of the vehicle system is controlled using the initialization data. For example, the vehicle system may move along the routes according to the schedule of the initialization data, an onboard segment of a vehicle control system can prevent the vehicle system from violating the mandatory directives, etc.

In one embodiment, a method includes receiving trip data for an upcoming trip of a vehicle system at an off-board device. The trip data includes information related to travel of the vehicle system within different sets of routes where the travel of the vehicle system within each of the different sets of the routes is restricted or controlled by a different back-office system. The method may include communicating (using the off-board device) the trip data to the different back-office systems, receiving one or more of mandatory directives or software configuration requirements at the off-board device from the different back-office systems responsive to communicating the trip data to the different back-office systems, and communicating an initialization data set that includes at least some of the trip data and at least some of the one or more of the mandatory directives or the software configuration requirements from the off-board device to an onboard controller of the vehicle system. The initialization data set is configured to be used by the onboard controller to control movement of the vehicle system in the different sets of the routes.

Optionally, the trip data that is received includes one or more of a first identification of which of the different sets of the routes that the vehicle system is planned to travel within, a unique identifier of the vehicle system for each of the different back-office systems, a change to consist information representative of one or more characteristics of the vehicle system, or a second identifier of a vehicle within the vehicle system that controls the movement of the vehicle system. The one or more mandatory directives received from the different back-office systems may include one or more segments of the routes having at least one of a reduced speed limit, a maintenance crew working on the one or more segments of the routes, another vehicle system present on the one or more segments of the routes, or a prohibition on the vehicle system entering into the one or more segments of the routes. The software configuration requirements received from the different back-office systems may include one or more different software versions or different configuration file versions required for communication by the vehicle control system with the different back-office systems. One or more of the software configuration requirements may be received at the off-board device from the different back-office systems. The method can include determining whether a software configuration of software used by the onboard controller to control the movement of the vehicle system according to one or more of the mandatory directives conflicts with the one or more software configuration requirements that were received, and one or more of (a) generating an operator notification of a conflict between the software configuration of the software used by the onboard controller and the one or more software configuration requirements or (b) changing the software configuration of the software used by the onboard controller to match the one or more software configuration requirements.

One or more of the mandatory directives may be received at the off-board device from the different back-office systems. The method can include receiving one or more of an operator acknowledgement or an operator acceptance of each of the one or more mandatory directives at the off-board device, and communicating an acceptance signal to one or more of the back-office systems that issued the one or more mandatory directives responsive to receiving the one or more of the operator acknowledgement or the operator acceptance. The initialization data set may be a single data file (even where the data file is communicated as several different and/or separate data packets).

Optionally, the initialization data set may include a unique identifier required by the onboard controller to be provided by an operator to initialize the onboard controller prior to departure for the upcoming trip. The method may include presenting, by the onboard controller onboard the vehicle system, contents of the initialization data set for approval by an operator, receiving one or more modifications to the contents of the initialization data set, and modifying the contents of the initialization data set prior to departure of the vehicle system for the upcoming trip. The method may include communicating (with the onboard controller) a polling signal to one or more of the back-office systems. The polling signal can request an identification of the mandatory directives that should be included in the initialization data set. The method can include receiving, with the onboard controller responsive to communicating the polling signal, a discrepancy between the identification of the mandatory directives that should be included in the initialization data set and the mandatory directives that are included in the initialization data set, and receiving an operator acceptance of the discrepancy at the onboard controller prior to departure of the vehicle system for the upcoming trip.

In one embodiment, a system includes an off-board computer device that may receive trip data for an upcoming trip of a vehicle system while the off-board computer device is off-board the vehicle system. The trip data includes information related to travel of the vehicle system within different sets of routes where the travel of the vehicle system within one or more of the different sets of the routes is restricted or controlled by a different back-office system. The off-board computer device may communicate the trip data to the different back-office systems and may receive one or more of mandatory directives or software configuration requirements from the different back-office systems responsive to communicating the trip data to the different back-office systems. The off-board computer device may communicate an initialization data set that includes at least some of the trip data and at least some of the one or more of the mandatory directives or the software configuration requirements to an onboard controller of the vehicle system. The initialization data set may be used by the onboard controller to control movement of the vehicle system in the different sets of the routes.

Optionally, the trip data that is received includes one or more of a first identification of which of the different sets of the routes that the vehicle system is planned to travel within, a unique identifier of the vehicle system for each of the different back-office systems, a change to consist information representative of one or more characteristics of the vehicle system, or a second identifier of a vehicle within the vehicle system that controls the movement of the vehicle system. The one or more mandatory directives received from the different back-office systems may include one or more segments of the routes having at least one of a reduced speed limit, a maintenance crew working on the one or more segments of the routes, another vehicle system present on the one or more segments of the routes, or a prohibition on the vehicle system entering into the one or more segments of the routes. The software configuration requirements may include one or more different software versions or different configuration file versions required for communication by the vehicle control system with the different back-office systems.

The off-board computer device may determine whether a software configuration of software used by the onboard controller to control the movement of the vehicle system according to one or more of the mandatory directives conflicts with the one or more software configuration requirements that were received. The off-board computer device can be configured to one or more of (a) generate an operator notification of a conflict between the software configuration of the software used by the onboard controller and the one or more software configuration requirements or (b) change the software configuration of the software used by the onboard controller to match the one or more software configuration requirements. The off-board computer device may be configured to receive one or more of an operator acknowledgement or an operator acceptance of each of the one or more mandatory directives at the off-board device. The off-board computer device is configured to communicate an acceptance signal to one or more of the back-office systems that issued the one or more mandatory directives responsive to receiving the one or more of the operator acknowledgement or the operator acceptance.

In one embodiment, a method includes receiving trip data for an upcoming trip of a vehicle system at an off-board device. The trip data includes information related to travel of the vehicle system within different sets of routes where the travel of the vehicle system within each of the different sets of the routes is restricted or controlled by a different back-office system. The method includes communicating, using the off-board the device, the trip data to the different back-office systems and receiving mandatory directives and software configuration requirements at the off-board device from the different back-office systems responsive to communicating the trip data to the different back-office systems. At least two of the different back-office systems have different software configuration requirements of the software configuration requirements. The method includes communicating an initialization data set that includes at least some of the trip data, the mandatory directives, and the software configuration requirements from the off-board device to an onboard controller of the vehicle system. The initialization data set is configured to be used by the onboard controller to control movement of the vehicle system in the different sets of the routes.

Optionally, the software configuration requirements received from the different back-office systems may include one or more different software versions or different configuration file versions required for communication by the vehicle control system with the different back-office systems. The method may include determining whether a software configuration of software used by the onboard controller to control the movement of the vehicle system according to one or more of the mandatory directives conflicts with one or more of the software configuration requirements that were received, and one or more of (a) generating an operator notification of a conflict between the software configuration of the software used by the onboard controller and the one or more software configuration requirements or (b) changing the software configuration of the software used by the onboard controller to match the one or more software configuration requirements. The initialization data set may include a unique identifier required by the onboard controller to be provided by an operator to initialize the onboard controller prior to departure for the upcoming trip.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A method comprising:
    receiving trip data for an upcoming trip of a vehicle system at an off-board device, the trip data including information related to travel of the vehicle system within different sets of routes where the travel of the vehicle system within each of the different sets of the routes is restricted or controlled by a different back-office system;
    communicating, using the off-board device, at least the trip data to the different back-office systems;
    receiving one or both of mandatory directives and software configuration requirements at the off-board device from the different back-office systems responsive to communicating the trip data to the different back-office systems; and
    communicating an initialization data set that includes at least some of the trip data and at least some of the one or both of the mandatory directives and the software configuration requirements from the off-board device to an onboard controller of the vehicle system, the initialization data set being configured to be used by the onboard controller to control movement of the vehicle system in the different sets of the routes.

2. The method of claim 1, wherein the trip data that is received includes a unique identifier of the vehicle system for each of the different back-office systems.

3. The method of claim 1, wherein one or more mandatory directives are received from the different back-office systems, and the one or more mandatory directives received from the different back-office systems include one or more segments of the routes having at least one of a reduced speed limit, a maintenance crew working on the one or more segments of the routes, another vehicle system present on the one or more segments of the routes, or a prohibition on the vehicle system entering into the one or more segments of the routes.

4. The method of claim 1, wherein one or more software configuration requirements are received from the different back-office systems, and the software configuration requirements received from the different back-office systems include one or more different software versions or different configuration file versions required for communication by the vehicle control system with the different back-office systems.

5. The method of claim 1, wherein one or more of the software configuration requirements are received at the off-board device from the different back-office systems, and further comprising:
determining whether a software configuration of software used by the onboard controller to control the movement of the vehicle system according to one or more of the mandatory directives conflicts with the one or more software configuration requirements that were received; and
one or more of (a) generating an operator notification of a conflict between the software configuration of the software used by the onboard controller and the one or more software configuration requirements or (b) changing the software configuration of the software used by the onboard controller to match the one or more software configuration requirements.

6. The method of claim 1, wherein one or more of the mandatory directives are received at the off-board device from the different back-office systems, and further comprising:
receiving one or more of an operator acknowledgement or an operator acceptance of each of the one or more mandatory directives at the off-board device; and
communicating an acceptance signal to one or more of the back-office systems that issued the one or more mandatory directives responsive to receiving the one or more of the operator acknowledgement or the operator acceptance.

7. The method of claim 1, wherein the initialization data set is a single data file or single file container.

8. The method of claim 1, wherein the initialization data set includes a unique identifier required by the onboard controller to be provided by an operator to initialize the onboard controller prior to departure for the upcoming trip.

9. The method of claim 1, further comprising:
presenting, by the onboard controller onboard the vehicle system, contents of the initialization data set for approval by an operator;
receiving one or more modifications to the contents of the initialization data set; and
modifying the contents of the initialization data set prior to departure of the vehicle system for the upcoming trip.

10. The method of claim 1, further comprising:
communicating, with the onboard controller, a polling signal to one or more of the back-office systems, the polling signal requesting an identification of the mandatory directives that should be included in the initialization data set;
receiving, with the onboard controller responsive to communicating the polling signal, a discrepancy between the identification of the mandatory directives that should be included in the initialization data set and the mandatory directives that are included in the initialization data set; and
receiving an operator acceptance of the discrepancy at the onboard controller prior to departure of the vehicle system for the upcoming trip.

11. A system comprising:
an off-board computer device configured to receive trip data for an upcoming trip of a vehicle system while the off-board computer device is off-board the vehicle system, the trip data including information related to travel of the vehicle system within different sets of routes where the travel of the vehicle system within each of the different sets of the routes is restricted or controlled by a different back-office system, the off-board computer device configured to directly communicate the trip data to the different back-office systems and to receive one or more of mandatory directives or software configuration requirements from the different back-office systems responsive to communicating the trip data to the different back-office systems,
the off-board computer device configured to communicate an initialization data set that includes at least some of the trip data and at least some of the one or more of the mandatory directives or the software configuration requirements to an onboard controller of the vehicle system, the initialization data set configured to be used by the onboard controller to control movement of the vehicle system in the different sets of the routes.

12. The system of claim 11, wherein the trip data that is received includes a unique identifier of the vehicle system for each of the different back-office systems.

13. The system of claim 11, wherein the off-board computer device is configured to receive one or more mandatory directives from the different back-office systems that include one or more segments of the routes having at least one of a reduced speed limit, a maintenance crew working on the one or more segments of the routes, another vehicle system present on the one or more segments of the routes, or a prohibition on the vehicle system entering into the one or more segments of the routes.

14. The system of claim 11, wherein the off-board computer device is configured to receive one or more software configuration requirements that include one or more different software versions or different configuration file versions required for communication by the vehicle control system with the different back-office systems.

15. The system of claim 11, wherein the off-board computer device is configured to receive one or more mandatory directives and one or more software requirement configurations, and the off-board computer device is configured to determine whether a software configuration of software used by the onboard controller to control the movement of the vehicle system according to one or more of the mandatory directives conflicts with the one or more software configuration requirements that were received, the off-board computer device configured to one or more of (a) generate an operator notification of a conflict between the software configuration of the software used by the onboard controller and the one or more software configuration requirements or (b) change the software configuration of the software used by the onboard controller to match the one or more software configuration requirements.

16. The system of claim 11, wherein the off-board computer device is configured to receive one or more mandatory directives, and the off-board computer device is configured to receive one or more of an operator acknowledgement or an operator acceptance of each of the one or more mandatory directives at the off-board device, the off-board computer device configured to communicate an acceptance signal to one or more of the back-office systems that issued the one or more mandatory directives responsive to receiving the one or more of the operator acknowledgement or the operator acceptance.

17. A method comprising:
   receiving trip data for an upcoming trip of a vehicle system at an off-board device, the trip data including information related to travel of the vehicle system within different sets of routes where the travel of the vehicle system within each of the different sets of the routes is restricted or controlled by a different back-office system;
   communicating, using the off-board the device, the trip data to the different back-office systems;
   receiving mandatory directives and software configuration requirements at the off-board device from the different back-office systems responsive to communicating the trip data to the different back-office systems, at least two of the different back-office systems having different software configuration requirements of the software configuration requirements; and
   communicating an initialization data set that includes at least some of the trip data, the mandatory directives, and the software configuration requirements from the off-board device to an onboard controller of the vehicle system, the initialization data set configured to be used by the onboard controller to control movement of the vehicle system in the different sets of the routes.

18. The method of claim 17, wherein the software configuration requirements received from the different back-office systems include one or more different software versions or different configuration file versions required for communication by the vehicle control system with the different back-office systems.

19. The method of claim 17, further comprising:
   determining whether a software configuration of software used by the onboard controller to control the movement of the vehicle system according to one or more of the mandatory directives conflicts with one or more of the software configuration requirements that were received; and
   one or more of (a) generating an operator notification of a conflict between the software configuration of the software used by the onboard controller and the one or more software configuration requirements or (b) changing the software configuration of the software used by the onboard controller to match the one or more software configuration requirements.

20. The method of claim 17, wherein the initialization data set includes a unique identifier required by the onboard controller to be provided by an operator to initialize the onboard controller prior to departure for the upcoming trip.

* * * * *